US012641376B2

(12) United States Patent
Fukamachi

(10) Patent No.: US 12,641,376 B2
(45) Date of Patent: May 26, 2026

(54) PRESSURE WAVE GENERATING ELEMENT AND METHOD FOR PRODUCING THE SAME

(71) Applicant: Murata Manufacturing Co., Ltd., Nagaokakyo (JP)

(72) Inventor: Kohei Fukamachi, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 231 days.

(21) Appl. No.: 18/355,777

(22) Filed: Jul. 20, 2023

(65) Prior Publication Data

US 2023/0370787 A1 Nov. 16, 2023

Related U.S. Application Data

(63) Continuation of application No. PCT/JP2022/004290, filed on Feb. 3, 2022.

(30) Foreign Application Priority Data

Feb. 19, 2021 (JP) ................................. 2021-025463

(51) Int. Cl.
*H04R 23/00* (2006.01)
*H04R 7/04* (2006.01)
*H04R 31/00* (2006.01)

(52) U.S. Cl.
CPC ............. *H04R 23/002* (2013.01); *H04R 7/04* (2013.01); *H04R 31/003* (2013.01); *H04R 2307/025* (2013.01); *H04R 2307/027* (2013.01); *H04R 2307/029* (2013.01)

(58) Field of Classification Search
CPC ...... H04R 23/002; H04R 7/04; H04R 31/003; H04R 2307/025; H04R 2307/027; H04R 1/028; H04R 31/00; B06B 1/02; B82Y 30/00
See application file for complete search history.

(56) References Cited

U.S. PATENT DOCUMENTS

| | | | |
|---|---|---|---|
| 9,968,892 | B2 | 5/2018 | Chu et al. |
| 10,582,310 | B1 | 3/2020 | Choe et al. |
| 11,154,821 | B2 | 10/2021 | Kas et al. |
| 2009/0268556 | A1 | 10/2009 | Jiang et al. |
| 2013/0092622 | A1 | 4/2013 | Kas et al. |
| 2016/0184778 | A1 | 6/2016 | Chu et al. |

(Continued)

FOREIGN PATENT DOCUMENTS

| | | | |
|---|---|---|---|
| JP | H11300274 | A | 11/1999 |
| JP | 2005256215 | A | 9/2005 |

(Continued)

OTHER PUBLICATIONS

Aliev et al., “Alternative Nanostructures for Thermophones,” ACS Nano, Mar. 8, 2015, vol. 9, No. 5, pp. 4743-4756.

(Continued)

*Primary Examiner* — Tuan D Nguyen
(74) *Attorney, Agent, or Firm* — ArentFox Schiff LLP

(57) ABSTRACT

A pressure wave generating element that includes a support; a fiber layer on the support, the fiber layer containing a fiber having a surface thereof at least partially coated with a metal coating, and the fiber in the fiber layer being oriented in a predetermined direction; and a pair of electrodes arranged so as to apply a voltage in an orientation direction of the fiber of the fiber layer.

20 Claims, 3 Drawing Sheets

(56) References Cited

U.S. PATENT DOCUMENTS

| | | | |
|---|---|---|---|
| 2017/0007741 A1 | 1/2017 | D'Lima et al. |
| 2022/0174425 A1 | 6/2022 | Fukamachi |

FOREIGN PATENT DOCUMENTS

| | | | |
|---|---|---|---|
| JP | 2009296591 A | 12/2009 |
| JP | 2013-187845 A | 9/2013 |
| JP | 2014-506190 A | 3/2014 |
| JP | 2014-514958 A | 6/2014 |
| JP | 2018133625 A | 8/2018 |
| WO | 2018/146951 A1 | 8/2018 |
| WO | 2021039169 A1 | 3/2021 |

OTHER PUBLICATIONS

International Search Report in PCT/JP2022/004290, mailed Apr. 12, 2022, 3 pages.

International Search Report in PCT/JP2022/004504, mailed Mar. 22, 2022, 3 pages.

PRESSURE WAVE GENERATING ELEMENT AND METHOD FOR PRODUCING THE SAME

CROSS REFERENCE TO RELATED APPLICATIONS

The present application is a continuation of International application No. PCT/JP2022/004290, filed Feb. 3, 2022, which claims priority to Japanese Patent Application No. 2021-025463, filed Feb. 19, 2021, the entire contents of each of which are incorporated herein by reference.

TECHNICAL FIELD

The present invention relates to a pressure wave generating element for generating a pressure wave by periodically heating air. The present invention also relates to a method for producing a pressure wave generating element.

BACKGROUND ART

A pressure wave generating element is also referred to as a thermophone and, for example, a resistor layer is provided on a support. When an electric current flows through the resistor, the resistor generates heat and thermally expands air in contact with the resistor. When the electric current is subsequently stopped, the expanded air contracts. Such periodic heating generates sound waves. When the drive signal is set to an audio frequency, it can be used as an audio speaker. When the drive signal is set to an ultrasonic frequency, it can be used as an ultrasonic source. Such a thermophone, which does not utilize a resonance mechanism, can generate a broadband short-pulse sound wave. A thermophone generates a sound wave after converting electrical energy into thermal energy. Thus, a thermophone is required to have improved energy conversion efficiency and sound pressure.

In Patent Document 1, a carbon nanotube structure in which a plurality of carbon nanotubes are arranged in parallel is provided as a resistor to increase the surface area in contact with air and to reduce heat capacity per unit area. In Patent Document 2, a silicon substrate is used as a heat dissipation layer, and porous silicon with low thermal conductivity is used as a heat-insulating layer, thereby improving the heat-insulating characteristics.

Patent Document 1: Japanese Unexamined Patent Application Publication No. 2009-296591

Patent Document 2: Japanese Unexamined Patent Application Publication No. 11-300274

SUMMARY OF THE INVENTION

In Patent Document 1, carbon nanotubes are used in a heat-generating layer to reduce heat capacity. Although carbon nanotubes have been put to practical use, they are likely to pose problems when practically used because of their high cost and difficulty in handling in production. Furthermore, carbon nanotubes have higher resistivity ($10^{-3}$ to $10^{-2}$ Ωcm) than metallic materials ($10^{-6}$ Ωcm), and an element must therefore be driven at high voltage to supply the same electric power.

It is an object of the present invention to provide a pressure wave generating element with improved sound pressure and an appropriate electrical resistance. It is another object of the present invention to provide a method for producing such a pressure wave generating element.

A pressure wave generating element according to one aspect of the present invention includes: a support; a fiber layer on the support, the fiber layer containing a fiber having a surface thereof at least partially coated with a metal coating, and the fiber in the fiber layer being oriented in a predetermined direction; and a pair of electrodes arranged so as to apply a voltage in an orientation direction of the fiber of the fiber layer.

A method for producing a pressure wave generating element according to another aspect of the present invention includes: forming a fiber film on a rotating drum using a fiber spun by an electrospinning method; bonding the fiber film to a support; and applying a metal coating to the fiber film to form a fiber layer.

In a pressure wave generating element according to the present invention, the fiber layer includes the fiber with the surface to which the metal coating is at least partially applied and has an increased surface area in contact with air, thereby improving sound pressure. The electrical resistance of the fiber layer can be set to an appropriate value by using a metallic material. The orientation of the fiber can reduce the electrical resistance of the fiber layer. This can increase the input power to the element and improve the sound pressure.

A method for producing a pressure wave generating element according to the present invention can provide a fiber layer with a large surface area in contact with air and with an appropriate electrical resistance. Furthermore, the rotating drum can increase the degree of orientation of the spun fiber.

DETAILED DESCRIPTION OF THE PREFERRED EMBODIMENTS

Figure 1:
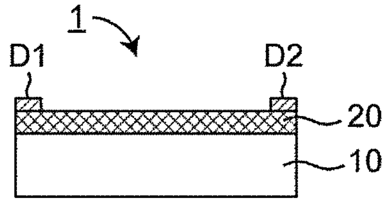
FIG. 1 is a cross-sectional view of an example of a pressure wave generating element according to a first embodiment of the present invention.

A pressure wave generating element according to one aspect of the present invention includes: a support; a fiber layer on the support, the fiber layer containing a fiber having a surface thereof at least partially coated with a metal coating, and the fiber in the fiber layer being oriented in a predetermined direction; and a pair of electrodes arranged so as to apply a voltage in an orientation direction of the fiber of the fiber layer. The term "oriented", as used herein, means that the direction of extension of a fiber is not completely random.

In this structure, the fiber layer contains the fibers with the surface to which the metal coating is at least partially applied. This can increase the surface area in contact with air and improve sound pressure per unit input power. The fibers can be arranged in the form of a non-woven fabric, a woven fabric, a knitted fabric, or a mixture thereof, and cavities around the fibers communicate with one another and ensure air permeability between internal cavities and the external space. Thus, the contact area between a porous structure composed of fibers and air is much higher than that of a non-porous smooth surface. This can increase the heat transfer efficiency from the fiber layer to air and improve the sound pressure.

Furthermore, the metal coating applied to at least part of the fiber can easily adjust the coating thickness and easily allows the electrical resistance of the fiber layer to be set to an appropriate value for the coating material selected. This can achieve a desired electrical resistance and optimize the drive voltage.

For example, a low thermally conductive material used as the fiber can reduce heat conduction from the fiber layer to the support. This can increase the temperature change on the surface of the fiber layer and improve the sound pressure per unit input power. A fiber layer containing such fibers has a porous structure, and it is therefore not necessary to introduce a heat-insulating layer for improving the sound pressure as in Patent Document 2.

Furthermore, the orientation of the fibers can reduce the electrical resistance of the fiber layer. This can increase the input power to the element and improve the sound pressure.

Furthermore, the further provided pair of electrodes for applying a voltage in the orientation direction of the fibers allows energization while the fiber layer has the lowest electrical resistance. This can increase the input power to the element and improve the sound pressure.

In the present invention, the fibers preferably have a degree of orientation of −0.6 or more.

This structure with the degree of orientation of the fibers being −0.6 or more can reduce the electrical resistance of the fiber layer. This can increase the input power to the element and improve the sound pressure.

In the present invention, the fiber preferably has a diameter of 20 nm to 1000 nm.

In this structure, the fiber with a smaller diameter can increase the specific surface area of the fiber layer and increase the sound pressure per unit input power. On the other hand, the fiber with a diameter of less than 20 nm has low strength and affects the durability and life of an element.

In the present invention, the fiber is preferably a polymer fiber. Specific examples of a material forming the polymer fiber include polyimide, polyamide, polyamideimide, polyethylene, polypropylene, acrylic resins, poly(vinyl chloride), polystyrene, poly(vinyl acetate), polytetrafluoroethylene, liquid crystal polymers, poly(phenylene sulfide), poly(ether ketone), polyarylate, polysulfone, poly(ether sulfone), poly (ether imide), polycarbonate, modified poly(phenylene ether), poly(butylene terephthalate), poly(ethylene terephthalate), polyacetal, poly(lactic acid), poly(vinyl alcohol), ABS resins, poly(vinylidene difluoride), cellulose, poly(ethylene oxide), poly(ethylene glycol), and polyurethane.

This enables spinning by an electrospinning method. Thus, fibers with a diameter in the range of 1 nm to 2000 nm, for example, nanofibers, submicron fibers, micron fibers, and the like can be provided.

In the present invention, the polymer fiber is preferably a polyimide fiber.

This can increase the heat resistance of the fiber layer. Thus, a heat treatment process, for example, reflow soldering may be applied in a subsequent step.

In the present invention, the thickness of the metal coating increases with an increasing distance from the support.

This can reduce heat generation in the fiber layer on the support side and increase heat generation in the fiber layer on the opposite side from the support. This reduces the heat conduction from the fiber layer to the support, improves the efficiency of heating air, and improves the sound pressure per unit input power.

A method for producing a pressure wave generating element according to another aspect of the present invention includes the steps of: forming a fiber film on a rotating drum using a fiber spun by an electrospinning method; bonding the fiber film to a support; and applying a metal coating to the fiber film to form a fiber layer.

In this structure, the fiber layer contains the fiber with the surface to which the metal coating is at least partially applied and functions as a heater. This can increase the surface area in contact with air and improve sound pressure per unit input power. Furthermore, a fiber layer with an appropriate electrical resistance can be easily provided.

Furthermore, the electrospinning method can be used to provide fibers with a diameter in the range of 1 nm to 2000 nm, for example, nanofibers, submicron fibers, micron fibers, and the like.

Furthermore, the rotation of the drum during spinning can be utilized to increase the degree of orientation of the fibers.

In the present invention, the rotating drum has a circumferential velocity in the range of 10472 mm/s to 31416 mm/s.

Thus, a fiber with an appropriate degree of orientation can be spun.

First Embodiment

FIG. 1 is a cross-sectional view of an example of a pressure wave generating element 1 according to a first embodiment of the present invention.

The pressure wave generating element 1 includes a support 10, a fiber layer 20, and a pair of electrodes D1 and D2. The support 10 is formed of a semiconductor, such as silicon, or an electrical insulator, for example, a ceramic substrate, such as glass, alumina, zirconia, magnesium oxide, aluminum nitride, boron nitride, or silicon nitride, or a flexible substrate, such as a PET film or a polyimide film. A thermal insulation layer with lower thermal conductivity than the support 10 may be provided on the support 10. The thermal insulation layer can reduce heat dissipation from the fiber layer 20 to the support 10. As described later, when the fiber layer 20 has a thermal insulation function, the thermal insulation layer may be omitted.

The fiber layer 20 is disposed on the support 10. The fiber layer 20 is formed of an electrically conductive material, is electrically driven and generates heat by the flow of an electric current, and emits a pressure wave due to the periodic expansion and contraction of air. The pair of electrodes D1 and D2 are disposed on both sides of the fiber layer 20. The electrodes D1 and D2 have a monolayer structure or a multilayer structure made of an electrically conductive material.

In the present embodiment, the fiber layer 20 contains a fiber with a surface to which metal coating is at least partially applied. This increases the surface area in contact with air and improves the sound pressure. The metal coating applied to the fiber can easily adjust the coating thickness and easily allows the electrical resistance of the fiber layer 20 to be set to an appropriate value for the coating material selected.

The fiber may be disposed directly on the support 10 or may be disposed on the support 10 with an adhesive layer of a polymer material or the like interposed therebetween.

Figure 2:
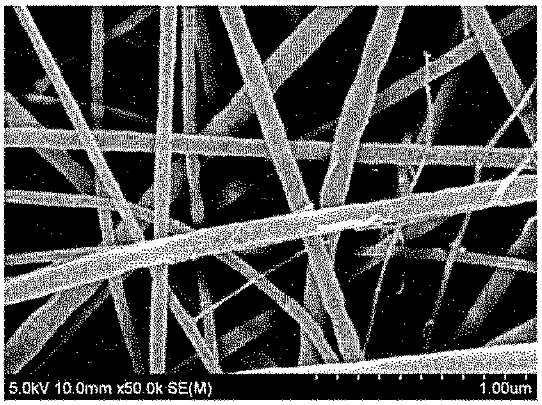
FIG. 2 is an electron micrograph of the surface of a fiber layer 20, in which the fibers are randomly oriented.
Figure 3:
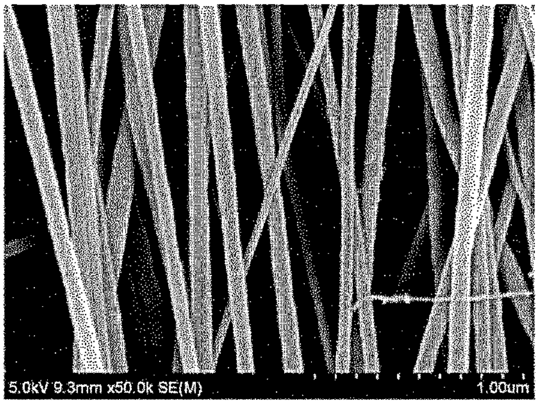
FIG. 3 is an electron micrograph of the surface of the fiber layer 20, in which fibers are oriented in a predetermined direction.

FIGS. 2 and 3 are electron micrographs of the surface of the fiber layer 20. In FIG. 2, fibers are randomly oriented and are bonded or entangled by thermal, mechanical, or chemical action into a sheet. In FIG. 3, fibers are oriented in a predetermined direction and are bonded or entangled by thermal, mechanical, or chemical action into a sheet. Metal coating is applied to the surface of the fiber.

The fiber may be selected from the group consisting of polymer fibers, glass fibers, carbon fibers, carbon nanotubes, metal fibers, and ceramic fibers. When the fiber is a low thermally conductive material, such as a polymer, glass, or ceramic, the fiber itself has a thermal insulation function and can reduce the heat conduction from the fiber layer to the support. This can increase the temperature change on the surface of the fiber layer and improve the sound pressure per unit input power.

The metal coating is preferably formed of, for example, a metallic material, such as Au, Ag, Cu, Pt, Rh, Pd, Ru, Ni, Ir, Cr, Mo, W, Ti, or Al, or an alloy containing two or more of these metals. The metal coating may have a monolayer structure or a multilayer structure made of a plurality of materials.

Second Embodiment

Figure 7:
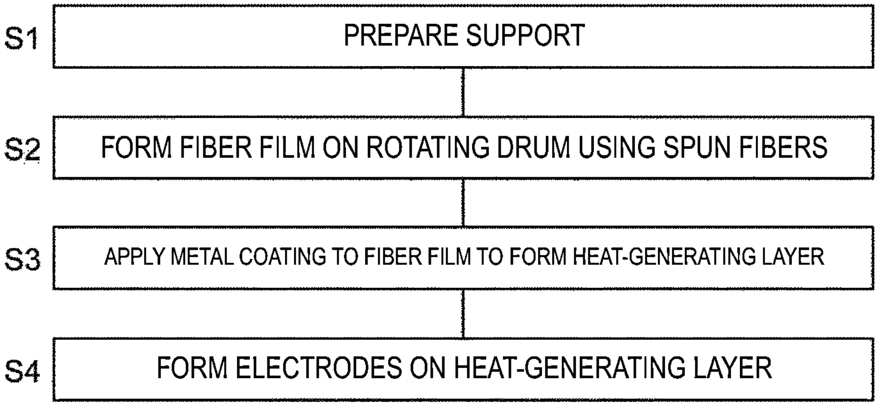
FIG. 7 is a flow chart of an example of a method for producing a pressure wave generating element.

FIG. 7 is a flow chart of an example of a method for producing a pressure wave generating element. First, the support 10 is prepared in the step S1.

Next, in the step S2, a fiber film is formed using spun fibers on the peripheral surface of a rotating drum collector. A melt blow method, a flash spinning method, a centrifugal spinning method, a melt spinning method, or the like may be used as a spinning method. It is also possible to use a method of crushing pulp as in cellulose nanofiber and processing it into a sheet. In particular, the electrospinning method may be used to provide nanofiber, submicron fiber, micron fiber, or the like.

Spinning while the drum rotates orients spun fibers in a predetermined direction (see FIG. 3). For example, a drum collector with a diameter of 200 mm rotated in the range of approximately 50 rpm to approximately 3000 rpm has a drum circumferential velocity in the range of approximately 524 mm/s to approximately 31400 mm/s.

Next, in the step S3, the resulting fiber film is separated and bonded onto the support 10, and metal coating is then applied to the fiber film to form the fiber layer 20. Vapor deposition, sputtering, electroplating, electroless plating, ion plating, an atomic layer deposition method, or the like may be used as a coating method. The metallic materials described above may typically be used.

Next, in the step S4, the pair of electrodes D1 and D2 are formed on the fiber layer 20. The electrodes may be formed by vapor deposition, sputtering, electroplating, electroless plating, ion plating, an atomic layer deposition method, printing, spray coating, dip coating, or the like. The electrode material is preferably formed of, for example, a metallic material, such as Au, Ag, Cu, Pt, Rh, Pd, Ru, Ni, Ir, Cr, Mo, W, Ti, Al, or Sn, or an alloy containing two or more of these metals. The structure of the electrodes may be a monolayer structure or a multilayer structure made of a plurality of materials.

EXAMPLES

Example 1

(Sample Preparation Method)

A pressure wave generating element was produced by the following method (Comparative Sample 1, Samples 1 to 4).

A polyimide (PI) solution prepared using N,N-dimethylformamide (DMF) as a solvent was used as a spinning solution. The spinning solution was prepared at a solution concentration of 8% by weight, and 0.1% by weight of lithium chloride was added to the solution. Furthermore, tetrabutylammonium chloride, potassium trifluoromethanesulfonate, and the like can be used as additive agents.

Using this solution, PI fibers were spun by the electrospinning method on aluminum foil attached to the peripheral surface of a drum collector. The drum collector used had a diameter of 200 mm and was rotated in the range of 50 rpm to 3000 rpm for spinning. The rotational speed can be increased to produce oriented fibers, for example, as shown in FIG. 3.

The electrospinning conditions were as follows: the applied voltage was 23 kV, the distance between a nozzle and the collector was 14 cm, and the film-forming time was adjusted so that the fiber film had a thickness in the range of approximately 1 to 80 μm. The formed fiber film was separated from the aluminum foil and was adhered onto a Si substrate (support). The adhesion to the substrate can be performed by applying an adhesive agent, such as epoxy, to the substrate in advance or by using a double-sided tape or the like. The substrate may be a ceramic substrate, such as glass, alumina, zirconia, magnesium oxide, aluminum nitride, boron nitride, or silicon nitride, or a flexible substrate, such as a PET film or a polyimide film.

A Au film with a thickness in the range of 1 to 40 nm was formed by a sputtering method on the fiber film formed on the substrate. The method of metal coating on the fibers may be a vapor deposition method, an ion plating method, an atomic layer deposition method, an electroless plating method, or the like. The metal species may be Au, Ag, Cu, Pt, Rh, Pd, Ru, Ni, Ir, Cr, Mo, W, Ti, or Al.

Figure 4:
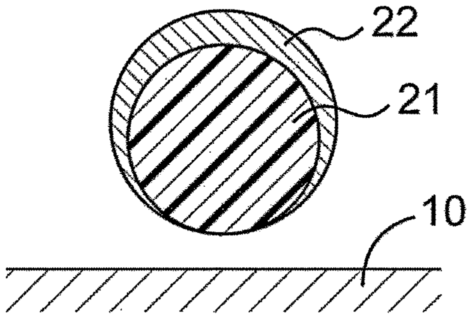
FIG. 4 is a cross-sectional view of the thickness distribution of metal coating.

The thickness of the metal coating may be uniform or nonuniform in the circumferential direction of the fibers and, for example, may increase with the distance from the support. The metal coating may satisfy $T1<T2$, wherein T1 denotes the thickness at a position closest to the support, and T2 denotes the thickness at a position farthest from the support. As for the form of the metal coating on the fibers, for example, as illustrated in FIG. 4, metal coating 22 is not necessarily applied to a lower portion of the peripheral surface of a fiber 21 near the support 10. This can reduce heat generation in the fiber layer on the support side and increase heat generation in the fiber layer on the opposite side from the support.

The coating state (a cross-sectional image) of the metal-coated fibers can be analyzed as described below. For example, a sample is processed with a focused ion beam (FIB), and the coating state of the fibers can be analyzed by observation with a transmission electron microscope (JEM-F200 manufactured by JEOL) and by element mapping analysis by energy dispersive X-ray spectroscopy.

The element thus produced was processed to have a size of 5 mm×6 mm. The pair of electrodes D1 and D2 were formed on both sides of the sample so as to have a size of 0.8 mm×4 mm and an interelectrode distance of 3.4 mm. The layered structure of the electrodes was Ti (10 nm in thickness), Cu (500 nm in thickness), and Au (100 nm in thickness) from the support side.

The electrodes may be formed by vapor deposition, sputtering, an ion plating method, an atomic layer deposition method, electroplating, electroless plating, application, spray coating, dip coating, or the like. The electrode material may be Au, Ag, Cu, Pt, Rh, Pd, Ru, Ni, Ir, Cr, Mo, W, Ti, or Al.

Figure 5A:
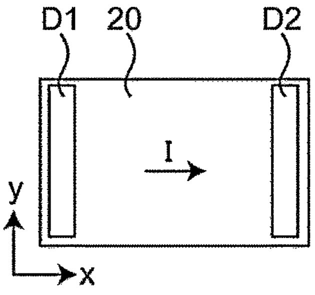
FIG. 5A is a plan view of an example of a pressure wave generating element.
Figure 5B:
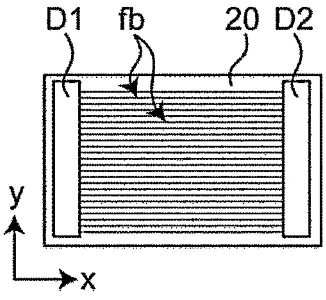
FIG. 5B is a schematic view of the orientation state of fibers fb in the fiber layer 20.

FIG. 5A is a plan view of an example of a pressure wave generating element. FIG. 5B is a schematic view of the orientation state of fibers fb in the fiber layer 20. The x direction corresponds to the rotational direction of the drum collector, and the fibers fb are oriented in the x direction. The electrodes D1 and D2 have an elongated shape in the y direction and are disposed near both ends of the fibers fb. When a voltage is applied between the electrodes D1 and D2 in the x direction, an electric current I flows in the x direction.

When the electric current flows in the orientation direction of the fibers fb (in the x direction in the figure), the electrical resistance of the fiber layer decreases. On the other hand, when the electric current flows in a direction perpendicular to the orientation direction of the fibers fb (in the y direction in the figure), the electrical resistance of the fiber layer increases. Thus, to increase the electric power supplied to the element to improve the sound pressure, the direction of the electric current I is preferably the same as the orientation direction of the fibers fb.

(Evaluation Method)

1) Electrical Characteristics (Sound Pressure, Electrical Resistance)

The sound pressure of a pressure wave generating element was measured with a MEMS microphone (Knowles, SPU0410LR5H). The distance between the pressure wave generating element and the microphone was 6 cm, and the evaluation was performed by reading the output voltage of the microphone at a drive signal frequency of 60 kHz. The input voltage to the pressure wave generating element was 18 V. The electrical resistance of the element was measured by a four-terminal method using a digital multimeter (Agilent, 34410A).

2) Fiber Diameter

The diameter of metal-coated fibers was determined as an average fiber diameter by observation with a scanning electron microscope (S-4800 manufactured by Hitachi, Ltd., accelerating voltage: 5 kV, magnification: 3k to 120k) to acquire a SEM image and by measuring the fiber diameter from the image. More specifically, 10 fibers per field of view were randomly extracted from a plurality of fibers except abnormal fibers in the image, and the extraction was performed in 5 fields of view to sample a total of 50 fibers. The diameters of these fibers were measured to calculate the average fiber diameter.

3) Degree of Orientation

The degree of orientation of fibers was calculated as described below. The degree of orientation of fibers was calculated by observation with a scanning electron microscope (S-4800 manufactured by Hitachi, Ltd., acceleration voltage: 5 kV, magnification: 1k to 20k) to acquire a SEM image, measuring the direction (angle) of fibers in the SEM image by needle-like material analysis using analysis software "A-Zou Kun (Asahi Kasei Engineering Corporation)", and evaluating the kurtosis. More specifically, in FIG. 5B, the image is acquired such that the y direction is 0 degrees (180 degrees) and the x direction is 90 degrees. 30 to 100 fibers were randomly selected in the image to measure the angle of each fiber and calculate the kurtosis. For example, the KURT function of spreadsheet software EXCEL can be used to calculate the kurtosis.

The kurtosis is defined by the following formula (1), is a statistic that shows how much the distribution deviates from the normal distribution, and shows the sharpness and spread of a peak. The kurtosis is 0 in the normal distribution, is less than 0 for low sharpness and short tailing, and is more than 0 for high sharpness and long tailing. In the formula, n denotes the sample size, xi denotes each data value, x bar denotes the average value, and s denotes the standard deviation.

$$\left\{\frac{n(n+1)}{(n-1)(n-2)(n-3)}\sum\left(\frac{x_i-\bar{x}}{s}\right)^4\right\}-\frac{3(n-1)^2}{(n-2)(n-3)} \tag{1}$$

TABLE 1

| | Rotational speed (rpm) | Circumferential velocity (mm/s) | Degree of orientation (kurtosis) | Fiber diameter after metal coating (nm) | Electrical resistance (Ω) | Sound pressure (Pa) |
|---|---|---|---|---|---|---|
| Comparative sample 1 | 50 | 524 | −0.9 | 86 | 78.4 | 0.19 |
| Sample 1 | 1000 | 10472 | 0.6 | 76 | 43.4 | 0.22 |
| Sample 2 | 2000 | 20944 | 2.0 | 85 | 28.2 | 0.26 |
| Sample 3 | 2500 | 26180 | 2.1 | 89 | 25.9 | 0.33 |
| Sample 4 | 3000 | 31416 | 3.3 | 77 | 22.4 | 0.32 |

(Method for Preparing Comparative Sample 2)

An element was prepared as Comparative Sample 2 using carbon nanotube (CNT).

A multilayer CNT ink (MW-I) manufactured by MEIJO NANO CARBON Co., Ltd. was used to form a film with a thickness in the range of approximately 500 nm to 1000 nm on a Si substrate by spin coating. The spin coating was performed at a rotational speed of 5000 rpm for 15 seconds, and drying was performed at 120° C.

To decompose a dispersant in the solution, the element was heat-treated at 400° C. for 2 hours. Thus, a CNT thin film was prepared. 0.8 mm×4 mm electrodes were formed on both sides of the sample at an interelectrode distance of 3.4 mm. The layered structure of the electrodes was Ti (10 nm in thickness), Cu (500 nm in thickness), and Au (100 nm in thickness) from the substrate side.

The characteristics of a pressure wave generating element including the CNT prepared by the above process were evaluated (in the same manner as in the evaluation method described above). The electrical resistance was 140Ω, and the sound pressure was 0.01 Pa.

TABLE 2

| | Material | Film forming method | Orientation | Electrical resistance (Ω) | Sound pressure (Pa) |
|---|---|---|---|---|---|
| Comparative sample 2 | CNT | Spin coating | Random | 140 | 0.01 |

The results of Tables 1 and 2 show that an element produced by applying Au coating to polyimide fibers oriented in a predetermined direction has lower electrical resistance and higher sound pressure than the case where a CNT film is formed by spin coating. It can also be seen that as the degree of orientation of the fibers increases, the electrical resistance decreases, and the sound pressure is further improved.

Thus, such fibers coated with the metallic material can be formed to provide a pressure wave generating element with low electrical resistance and high sound pressure. The electrical resistance of the element can be further reduced to provide a pressure wave generating element that can be driven at low voltage.

The orientation of the fibers can increase the packing and the denseness of the fibers and provide a pressure wave generating element with low electrical resistance and high sound pressure.

The metal film formed using fibers with a fiber diameter of 1 μm or less as a mold can increase the specific surface area of the fiber layer and increase the sound pressure.

When used as the fibers, a low thermally conductive material, such as a polymer, has a heat-insulating effect in the direction of the substrate, increases the temperature change on the surface of a heating element, and can increase the sound pressure. For example, a polyimide has a thermal conductivity of approximately 0.28 W/m·K, and $SiO_2$ (an oxidized layer on the surface of a Si substrate) has a thermal conductivity of approximately 1.3 W/m·K. Thus, a polyimide has lower thermal conductivity, has a higher heat-insulating effect on the substrate side, and has higher sound pressure.

When the fibers are formed of a polyimide with high heat resistance (300° C. or more), a heat treatment process, for example, reflow soldering can be performed in a subsequent step.

Example 2

(Sample Preparation Method)

A pressure wave generating element was produced by the following method (Comparative Sample 3, Samples 5 to 7).

A polyimide (PI) solution prepared using N,N-dimethylformamide (DMF) as a solvent was used as a spinning solution. The spinning solution was prepared at a solution concentration of 6% by weight, and 0.1% by weight of lithium chloride was added to the solution. Furthermore, tetrabutylammonium chloride, potassium trifluoromethanesulfonate, and the like can be used as additive agents.

Using this solution, PI fibers were spun by the electrospinning method on aluminum foil attached to the peripheral surface of a drum collector. The drum collector used had a diameter of 200 mm and was rotated in the range of 50 rpm to 3000 rpm for spinning. The rotational speed can be increased to produce oriented fibers, for example, as shown in FIG. 3.

The electrospinning conditions were as follows: the applied voltage was 29 kV, the distance between the nozzle and the collector was 14 cm, and the film-forming time was adjusted so that the fiber film had a thickness in the range of approximately 1 to 80 μm. The formed fiber film was separated from the aluminum foil and was adhered onto a Si substrate (support). The adhesion to the substrate can be performed by applying an adhesive agent, such as epoxy, to the substrate in advance or by using a double-sided tape or the like. The substrate may be a ceramic substrate, such as glass, alumina, zirconia, magnesium oxide, aluminum nitride, boron nitride, or silicon nitride, or a flexible substrate, such as a PET film or a polyimide film.

A Au film with a thickness in the range of 1 to 40 nm was formed by a sputtering method on the fiber film formed on the substrate. The method of metal coating on the fibers may be a vapor deposition method, an ion plating method, an atomic layer deposition method, an electroless plating method, or the like. The metal species may be Au, Ag, Cu, Pt, Rh, Pd, Ru, Ni, Ir, Cr, Mo, W, Ti, or Al.

The form of the metal coating (FIG. 4), the element size, the electrode formation method, the electrode structure and the fiber orientation (FIGS. 5A and 5B), and the evaluation method are the same as those described in (Example 1).

In Example 2, the solution concentration was decreased from 8% by weight of Example 1 to 6% by weight, and the electrospinning applied voltage was increased from 23 kV of Example 1 to 29 kV. This results in finer spun fibers, a smaller fiber diameter after the metal coating, and the fiber film with a higher density.

TABLE 3

| | Rotational speed (rpm) | Circumferential velocity (mm/s) | Degree of orientation (kurtosis) | Fiber diameter after metal coating (nm) | Electrical resistance (Ω) | Sound pressure (Pa) |
|---|---|---|---|---|---|---|
| Comparative sample 3 | 50 | 524 | −1.1 | 51 | 23.6 | 0.30 |
| Sample 5 | 1000 | 10472 | −0.6 | 53 | 13.8 | 0.55 |
| Sample 6 | 2000 | 20944 | 0.5 | 58 | 10.7 | 0.58 |
| Sample 7 | 3000 | 31416 | 3.2 | 55 | 8.0 | 0.68 |

The results in Table 3 show that, even in the finer fibers, as the degree of orientation of the fibers increases, the electrical resistance decreases, and the sound pressure is further improved.

Example 3

(Sample Preparation Method)

A pressure wave generating element was produced by the following method (Comparative Sample 4, Sample 8).

A polyimide (PI) solution prepared using N,N-dimethylformamide (DMF) as a solvent was used as a spinning solution. The spinning solution was prepared at a solution concentration of 10% by weight.

Using this solution, PI fibers were spun by the electrospinning method on aluminum foil attached to the peripheral surface of a drum collector. The drum collector used had a diameter of 200 mm and was rotated at 50 rpm and 3000 rpm for spinning. The rotational speed can be increased to produce oriented fibers, for example, as shown in FIG. 3.

The electrospinning conditions were as follows: the applied voltage was 29 kV, the distance between the nozzle and the collector was 14 cm, and the film-forming time was adjusted so that the fiber film had a thickness in the range of approximately 1 to 80 μm. The formed fiber film was separated from the aluminum foil and was adhered onto a Si substrate (support). The adhesion to the substrate can be performed by applying an adhesive agent, such as epoxy, to the substrate in advance or by using a double-sided tape or the like. The substrate may be a ceramic substrate, such as glass, alumina, zirconia, magnesium oxide, aluminum nitride, boron nitride, or silicon nitride, or a flexible substrate, such as a PET film or a polyimide film.

A Au film with a thickness in the range of 1 to 40 nm was formed by a sputtering method on the fiber film formed on the substrate. The method of metal coating on the fibers may be a vapor deposition method, an ion plating method, an atomic layer deposition method, an electroless plating method, or the like. The metal species may be Au, Ag, Cu, Pt, Rh, Pd, Ru, Ni, Ir, Cr, Mo, W, Ti, or Al.

The form of the metal coating (FIG. 4), the element size, the electrode formation method, the electrode structure and the fiber orientation (FIGS. 5A and 5B), and the evaluation method are the same as those described in (Example 1).

In Example 3, the solution concentration was increased from 8% by weight of Example 1 to 10% by weight, and the electrospinning applied voltage was increased from 23 kV of Example 1 to 29 kV. This results in thicker spun fibers, a larger fiber diameter after the metal coating, and the fiber film with a lower density.

TABLE 4

| | Rotational speed (rpm) | Circumferential velocity (mm/s) | Degree of orientation (kurtosis) | Fiber diameter after metal coating (nm) | Electrical resistance (Ω) | Sound pressure (Pa) |
|---|---|---|---|---|---|---|
| Comparative sample 4 | 50 | 524 | −1.4 | 140 | 194.5 | 0.066 |
| Sample 8 | 3000 | 31416 | 2.0 | 138 | 95.8 | 0.091 |

The results in Table 4 show that, even in the thicker fibers, as the degree of orientation of the fibers increases, the electrical resistance decreases, and the sound pressure is further improved.

Example 4

(Sample Preparation Method)

A pressure wave generating element was produced by the following method (Comparative Sample 5, Sample 9).

A poly(amic acid) solution prepared using N,N-dimethylacetamide (DMAc) as a solvent was used as a spinning solution. The spinning solution was prepared at a solution concentration of 25% by weight.

Using this solution, poly(amic acid) fibers were spun by the electrospinning method on aluminum foil attached to the peripheral surface of a drum collector. The drum collector used had a diameter of 200 mm and was rotated at 50 rpm and 3000 rpm for spinning. The rotational speed can be increased to produce oriented fibers, for example, as shown in FIG. 3.

The electrospinning conditions were as follows: the applied voltage was 23 kV, the distance between a nozzle and the collector was 14 cm, and the film-forming time was adjusted so that the fiber film had a thickness in the range of approximately 1 to 80 μm. The poly(amic acid) fibers were heat-treated (imidized) at 300° C. for 1 hour to prepare polyimide fibers. Although a polymeric material with a low thermal decomposition temperature or melting point cannot be subjected to a heat treatment process to prepare a fiber film, a polyimide material has heat resistance and can be subjected to a heat treatment process.

The formed fiber film was separated from the aluminum foil and was adhered onto a Si substrate (support). The adhesion to the substrate can be performed by applying an adhesive agent, such as epoxy, to the substrate in advance or by using a double-sided tape or the like. The substrate may be a ceramic substrate, such as glass, alumina, zirconia, magnesium oxide, aluminum nitride, boron nitride, or silicon nitride, or a flexible substrate, such as a PET film or a polyimide film.

A Au film with a thickness in the range of 1 to 100 nm was formed by a sputtering method on the fiber film formed on the substrate. The method of metal coating on the fibers may be a vapor deposition method, an ion plating method, an atomic layer deposition method, an electroless plating method, or the like. The metal species may be Au, Ag, Cu, Pt, Rh, Pd, Ru, Ni, Ir, Cr, Mo, W, Ti, or Al.

The form of the metal coating (FIG. 4), the element size, the electrode formation method, the electrode structure and the fiber orientation (FIGS. 5A and 5B), and the evaluation method are the same as those described in (Example 1). In the present example, the input voltage to the pressure wave generating element in the sound pressure measurement was 8 V.

TABLE 5

| | Rotational speed (rpm) | Circumferential velocity (mm/s) | Degree of orientation (kurtosis) | Fiber diameter after metal coating (nm) | Electrical resistance (Ω) | Sound pressure (Pa) |
|---|---|---|---|---|---|---|
| Comparative sample 5 | 50 | 524 | −1.5 | 812 | 18.8 | 0.039 |
| Sample 9 | 3000 | 31416 | 1.6 | 740 | 10.5 | 0.075 |

The results in Table 4 show that, even in the thicker fibers, as the degree of orientation of the fibers increases, the electrical resistance decreases, and the sound pressure is further improved.

Figure 6:
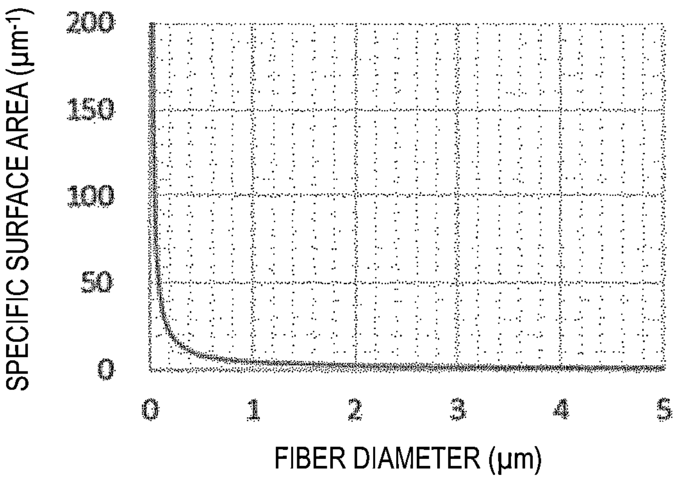
FIG. 6 is a graph of the relationship between the fiber diameter in a fiber layer and the estimated specific surface area.

FIG. 6 is a graph of the relationship between the fiber diameter in a fiber layer and the estimated specific surface area. A fiber diameter of 1 μm or less results in the fiber layer with a rapidly increased specific surface area (a super specific surface area effect). For example, the specific surface area is 200 $\mu m^{-1}$ when the fiber diameter is 20 nm. The diameter of fibers used for the fiber layer is preferably 20 nm to 1000 nm. Fibers with a smaller diameter can increase the specific surface area of the fiber layer and increase the sound pressure per unit input power. On the other hand, fibers with a diameter of less than 20 nm have low strength and affect the durability and life of an element.

As described above, the fiber layer includes fibers with a surface to which the metal coating is at least partially applied and has an increased surface area in contact with air, thereby improving the sound pressure. Furthermore, the electrical resistance of the fiber layer can be set to an appropriate value by using a metallic material. Furthermore, the orientation of fibers can reduce the electrical resistance of the fiber layer. This can increase the input power to the element and improve the sound pressure.

Although the present invention has been fully described in connection with preferred embodiments with reference to the accompanying drawings, various variations and modifications will be apparent to those skilled in the art. It is to be understood that such variations and modifications are within the scope of the present invention defined by the appended claims as long as they do not depart from the scope of the present invention.

The present invention is industrially very useful in that a pressure wave generating element with improved sound pressure and appropriate electrical resistance can be provided.

REFERENCE SIGNS LIST

1 pressure wave generating element
10 support
20 fiber layer
21 fiber
22 metal coating
D1, D2 electrode

The invention claimed is:

1. A pressure wave generating element comprising:
a support;
a fiber layer on the support, the fiber layer containing a fiber having a surface thereof at least partially coated with a metal coating, and the fiber in the fiber layer being oriented in a predetermined direction; and
a pair of electrodes arranged so as to apply a voltage in an orientation direction of the fiber of the fiber layer,
wherein the support covers an entire surface of one side of the fiber layer.

2. The pressure wave generating element according to claim 1, wherein the fiber has a degree of orientation of −0.6 or more.

3. The pressure wave generating element according to claim 2, wherein the fiber has a diameter of 20 nm to 1000 nm.

4. The pressure wave generating element according to claim 1, wherein the fiber has a diameter of 20 nm to 1000 nm.

5. The pressure wave generating element according to claim 1, wherein the fiber is a polymer fiber.

6. The pressure wave generating element according to claim 5, wherein the polymer fiber is a polyimide fiber.

7. The pressure wave generating element according to claim 5, wherein a material of the polymer fiber is selected from polyimide, polyamide, polyamideimide, polyethylene, polypropylene, acrylic resins, poly(vinyl chloride), polystyrene, poly(vinyl acetate), polytetrafluoroethylene, liquid crystal polymers, poly(phenylene sulfide), poly(ether ketone), polyarylate, polysulfone, poly(ether sulfone), poly (ether imide), polycarbonate, modified poly(phenylene ether), poly(butylene terephthalate), poly(ethylene terephthalate), polyacetal, poly(lactic acid), poly(vinyl alcohol), ABS resins, poly(vinylidene difluoride), cellulose, poly(ethylene oxide), poly(ethylene glycol), and polyurethane.

8. The pressure wave generating element according to claim 1, wherein a thickness of the metal coating increases with an increasing distance from the support.

9. The pressure wave generating element according to claim 1, wherein the metal coating contains a metallic material selected from Au, Ag, Cu, Pt, Rh, Pd, Ru, Ni, Ir, Cr, Mo, W, Ti, or Al, or an alloy thereof.

10. A method for producing a pressure wave generating element, the method comprising:
forming a fiber film on a rotating drum using a fiber spun by an electrospinning method;
bonding the fiber film to a support such that the support covers an entire surface of one side of the fiber film; and
applying a metal coating to the fiber film to form a fiber layer.

11. The method for producing a pressure wave generating element according to claim 10, wherein the rotating drum has a circumferential velocity in a range of 10472 mm/s to 31416 mm/s.

12. The method for producing a pressure wave generating element according to claim 10, wherein the fiber has a degree of orientation of −0.6 or more.

13. The method for producing a pressure wave generating element according to claim 12, wherein the fiber has a diameter of 20 nm to 1000 nm.

14. The method for producing a pressure wave generating element according to claim 10, wherein the fiber has a diameter of 20 nm to 1000 nm.

15. The method for producing a pressure wave generating element according to claim 10, wherein the fiber is a polymer fiber.

16. The method for producing a pressure wave generating element according to claim 15, wherein the polymer fiber is a polyimide fiber.

17. The method for producing a pressure wave generating element according to claim 15, wherein a material of the polymer fiber is selected from polyimide, polyamide, polyamideimide, polyethylene, polypropylene, acrylic resins, poly(vinyl chloride), polystyrene, poly(vinyl acetate), polytetrafluoroethylene, liquid crystal polymers, poly(phenylene sulfide), poly(ether ketone), polyarylate, polysulfone, poly (ether sulfone), poly(ether imide), polycarbonate, modified poly(phenylene ether), poly(butylene terephthalate), poly (ethylene terephthalate), polyacetal, poly(lactic acid), poly (vinyl alcohol), ABS resins, poly(vinylidene difluoride), cellulose, poly(ethylene oxide), poly(ethylene glycol), and polyurethane.

18. The method for producing a pressure wave generating element according to claim 10, wherein a thickness of the metal coating increases with an increasing distance from the support.

19. The method for producing a pressure wave generating element according to claim 10, wherein the metal coating contains a metallic material selected from Au, Ag, Cu, Pt, Rh, Pd, Ru, Ni, Ir, Cr, Mo, W, Ti, or Al, or an alloy thereof.

20. The method for producing a pressure wave generating element according to claim 10, further comprising forming a pair of electrodes that are arranged so as to apply a voltage in an orientation direction of the fiber of the fiber layer.

* * * * *